(12) United States Patent
Liu et al.

(10) Patent No.: US 10,290,316 B1
(45) Date of Patent: May 14, 2019

(54) DETECTION SYSTEM OF VINYL RECORD PLAYER FOR DETECTING END OF PLAYBACK

(71) Applicant: HANPIN ELECTRON CO., LTD., Tainan (TW)

(72) Inventors: Shen-Keng Liu, Tainan (TW); Tse-Ming Lan, Tainan (TW)

(73) Assignee: Hanpin Electron Co., Ltd., Tainan (TW)

( * ) Notice: Subject to any disclaimer, the term of this patent is extended or adjusted under 35 U.S.C. 154(b) by 0 days.

(21) Appl. No.: 16/003,493

(22) Filed: Jun. 8, 2018

(51) Int. Cl.
- *G11B 3/00* (2006.01)
- *G11B 19/14* (2006.01)

(52) U.S. Cl.
CPC .......... *G11B 19/14* (2013.01); *G11B 3/00* (2013.01)

(58) Field of Classification Search
None
See application file for complete search history.

(56) References Cited

U.S. PATENT DOCUMENTS

| | | | | |
|---|---|---|---|---|
| 3,599,984 A * | 8/1971 | Kondo | | 369/226 |
| 3,622,163 A * | 11/1971 | Bachman | | G11B 3/08587 369/181 |
| 3,689,079 A * | 9/1972 | Matsuda | | G11B 3/08512 250/231.13 |
| 3,906,169 A * | 9/1975 | Iwase | | G11B 3/64 360/15 |
| 4,119,844 A * | 10/1978 | Morrison | | G11B 3/42 250/239 |
| 4,121,834 A * | 10/1978 | Yestrebi | | G11B 3/08583 369/233 |
| 4,166,625 A * | 9/1979 | Frielingsdorf | | G11B 3/08506 369/230 |
| 4,167,026 A * | 9/1979 | Sambe | | G11B 3/08541 360/15 |
| 4,498,164 A * | 2/1985 | Lebensfeld | | G11B 3/40 369/177 |

FOREIGN PATENT DOCUMENTS

DE 202017105768 U1 * 9/2017

* cited by examiner

Primary Examiner — William J Klimowicz
(74) Attorney, Agent, or Firm — Rosenberg, Klein & Lee

(57) ABSTRACT

A detection system of vinyl record players for detecting end of playback is revealed. The system includes a vinyl record player and a vinyl record control module. The vinyl record player consists of a tone arm, a cartridge connected to one end of the tone arm, a stylus connected to the cartridge, and a turntable. The vinyl record control module is arranged at the vinyl record player and is composed of a signal analysis unit, a signal output unit, a signal reading unit, and a vinyl record control unit electrically connected. The vinyl record control unit is electrically connected to a turntable control unit for stopping rotation of the turntable, or electrically connected to a tone arm lifting unit for ascending the tone arm, or electrically connected to both the turntable control unit and the tone arm lifting unit.

18 Claims, 3 Drawing Sheets

DETECTION SYSTEM OF VINYL RECORD PLAYER FOR DETECTING END OF PLAYBACK

BACKGROUND OF THE INVENTION

Field of the Invention

The present invention relates to a detection system of a vinyl record player, especially to a detection system of a vinyl record player that makes a tone arm ascend or a turntable stop rotating automatically while detecting the end of playback. Thus the wear and tear of a stylus caused by a rotating vinyl record after the record has finished playing can be avoided.

Description of Related Art

A phonograph record is a flat disc with a spiral groove for storage of analog sounds. In early days, phonograph records with typical length around 305 minutes per side are played at 78 rpm and called standard playing (SP) or coarsegroove record. In 1950, 45 rpm discs have replaced 78 rpm and being called extended playing (EP) or microgroove records. The typical length is often around one song per side and extended up two songs per side. Then a vinyl record with tight groove spacing and characterized by a speed of 33⅓ rpm and a length of 30 minutes per side has appeared. It's also called LP (long playing). The LP is most popular with the consumer public owing to light weight and better frequency response.

The phonograph record is played by a record player at the speed it was recorded. The record is put on a turntable and driven by the turntable to rotate continuously. Then a stylus connected to a cartridge of the record player is placed into a groove of the record and sliding in the groove. As the stylus tracks in the groove, it picks up vibrations and transferred to coils and magnets in the cartridge to have electromagnetic induction therein. Thus sound waves etched in the record groove are converted into audio electrical signals to be displayed by a player. Therefore users can hear sounds on the record.

In a conventional vinyl record player, the tone arm is manually moved over the record and then is descended by pulling a tone arm lifter lever. Thus the stylus is in contact with the groove of the record. After the playback, the tone arm is ascended by users pushing the tone arm lifter lever and then the tone arm is moved to the tone arm rest. The whole process is manually operated by the user. However, users may have something else to deal with or even feel relaxed and fall asleep during playback of the record. At the end of the playback, the user doesn't move the tone arm immediately so that the turntable and the record keep rotating. The stylus still sliding in the innermost groove will have wear and tear caused by friction between the stylus and the groove. Thus there is a room for improvement and there is a need to provide a device that lifts the tone arm or stops the turntable automatically after the record has finished playing for reducing wear of the stylus and increasing service life of the stylus.

SUMMARY OF THE INVENTION

Therefore it is a primary object of the present invention to provide a detection system of vinyl record players for detecting the end of playback, which determines the playing of the record is finished by feedback signals from the stylus. Moreover, the tone arm is ascended automatically or the turntable stops rotating under control of the system. Thus the stylus is not in contact with the rotating record and the wear of the stylus is minimized. The user doesn't need to pay attention to the record at all times.

In order to achieve the above object, a detection system of vinyl record players for detecting the end of playback according to the present invention includes a vinyl record player and a vinyl record control module arranged at the vinyl record player. The vinyl record player consists of a tone arm, a cartridge connected to one end of the tone arm, a stylus connected to the cartridge and a turntable while the vinyl record control module is composed of a signal analysis unit, a signal output unit, a signal reading unit, and a vinyl record control unit. The vinyl record control unit is electrically connected to the signal analysis unit and the signal output unit while the signal analysis unit and the signal output unit are further electrically connected to the signal reading unit. The stylus is electrically connected to the signal output unit. The vinyl record control module further includes a tone arm lifting unit, or a turntable control unit, or both. The vinyl record control unit is electrically connected to the turntable control unit for stopping rotation of the turntable, or electrically connected to the tone arm lifting unit for ascending the tone arm, or electrically connected to both the turntable control unit and the tone arm lifting unit.

Preferably, a record is placed on the turntable.

Preferably, the record includes a lead-in groove, a sound groove connected to the lead-in groove, a lead-out groove connected to the sound groove, and a lock groove connected to the lead-out groove.

Preferably, the signal output unit receives signals from the stylus.

Preferably, the turntable control unit is electrically connected to the turntable.

Preferably, the turntable control unit drives the turntable directly by a drive motor. Or the drive motor is connected to a belt through which the turntable is driven by the turntable control unit.

Preferably, the tone arm lifting unit is electrically connected to the tone arm.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn functions and features of the present invention, please refer to the following embodiment and the related figures.

Figure 1:
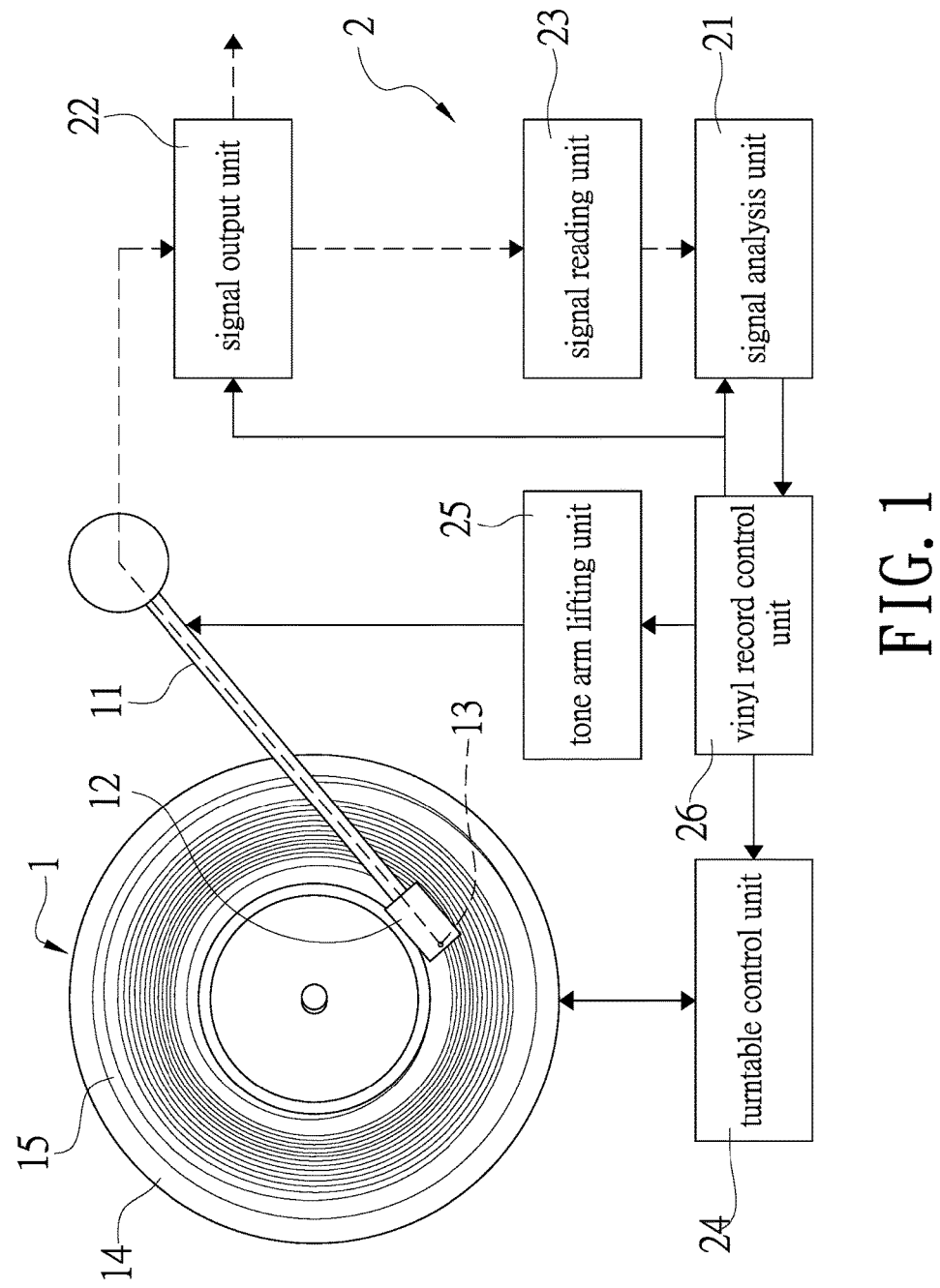
FIG. 1 is a block diagram showing structure of an embodiment according to the present invention.
Figure 2:
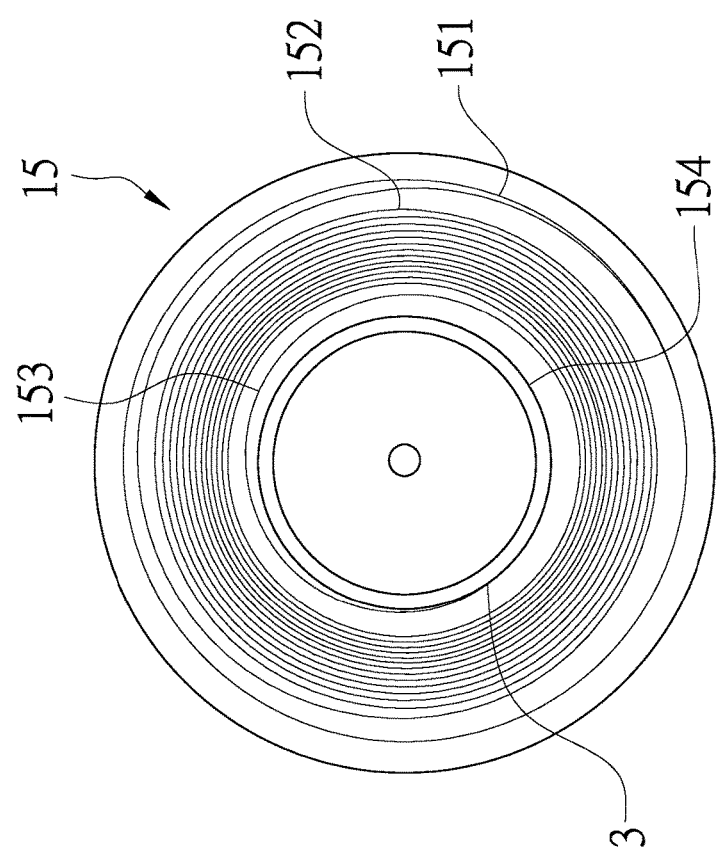
FIG. 2 is a schematic drawing showing structure of a record of an embodiment according to the present invention.

Refer to FIG. 1 and FIG. 2, a detection system of vinyl record players for detecting the end of playback according to the present invention includes a vinyl record player 1 and a vinyl record control module 2 arranged at the vinyl record player 1. The vinyl record player 1 consists of a tone arm 11, a cartridge 12 connected to one end of the tone arm 11, a stylus 13 connected to the cartridge 12 and a turntable 14. A record 15 is set on the turntable 14 and is having a lead-in groove 151, a sound groove 152 connected to the lead-in groove 151, a lead-out groove 153 connected to the sound groove 152, and a lock groove 154 connected to the lead-out groove 153. The vinyl record control module 2 is mounted to the vinyl record player 1 and composed of a signal analysis unit 21, a signal output unit 22, a signal reading unit 23, and a vinyl record control unit 26. The vinyl record control module 2 further includes a turntable control unit 24, or a tone arm lifting unit 25, or both the turntable control unit 24 and the tone arm lifting unit 25. The vinyl record control unit 26 is electrically connected to the signal analysis unit 21 and the signal output unit 22. The signal analysis unit 21 and the signal output unit 22 are further electrically connected to the signal reading unit 23. The stylus 13 is electrically connected to the signal output unit 22 so that the signal output unit 22 receives signals from the stylus 13. The vinyl record control unit 26 can be further electrically connected to the turntable control unit 24, or the tone arm lifting unit 25 or both the turntable control unit 24 and the tone arm lifting unit 25. The turntable 14 is electrically connected to the turntable control unit 24 and is directly driven by a drive motor. Or the turntable control unit 24 drives the turntable 14 through a belt connected to the drive motor. The tone arm 11 is electrically connected to the tone arm lifting unit 25.

Refer to FIG. 1 and FIG. 2, the detection system of vinyl record players for detecting the end of playback includes the vinyl record player 1 and the vinyl record control module 2 mounted to the vinyl record player 1. Once users intend to play the record 15, the record 15 is placed on the turntable 14 of the vinyl record player 1. Then users can send a command to the turntable control unit 24 through the vinyl record control module 2. First set the rotational speed according to the specification of the record 15 and the record 15 comes in three speeds: 33⅓ rpm, 45 rpm, and 78 rpm. Then turn on the turntable control unit 24 through the vinyl record control unit 26. Thus the turntable control unit 24 controls the electrically connected turntable 14 of the vinyl record player 1 to start rotating. The turntable control unit 24 drives the turntable 14 directly by a drive motor. Or the turntable control unit 24 is connected to a belt through a drive motor for driving the turntable 14. During rotation of the record 15, the user moves the tone arm 11 over the record 15 and then descends the tone arm 11 by using the vinyl record control unit 26. Thus the stylus 13 of the cartridge 12 is in contact with the record 15. During the contact, the signal output unit 22 receives signals from the stylus 13 continuously, converts the signals according to the settings of a control unit of the record 15, and outputs the signals with different magnitudes to an amplifier or other equipment for playing sounds on the record 15.

Figure 3:
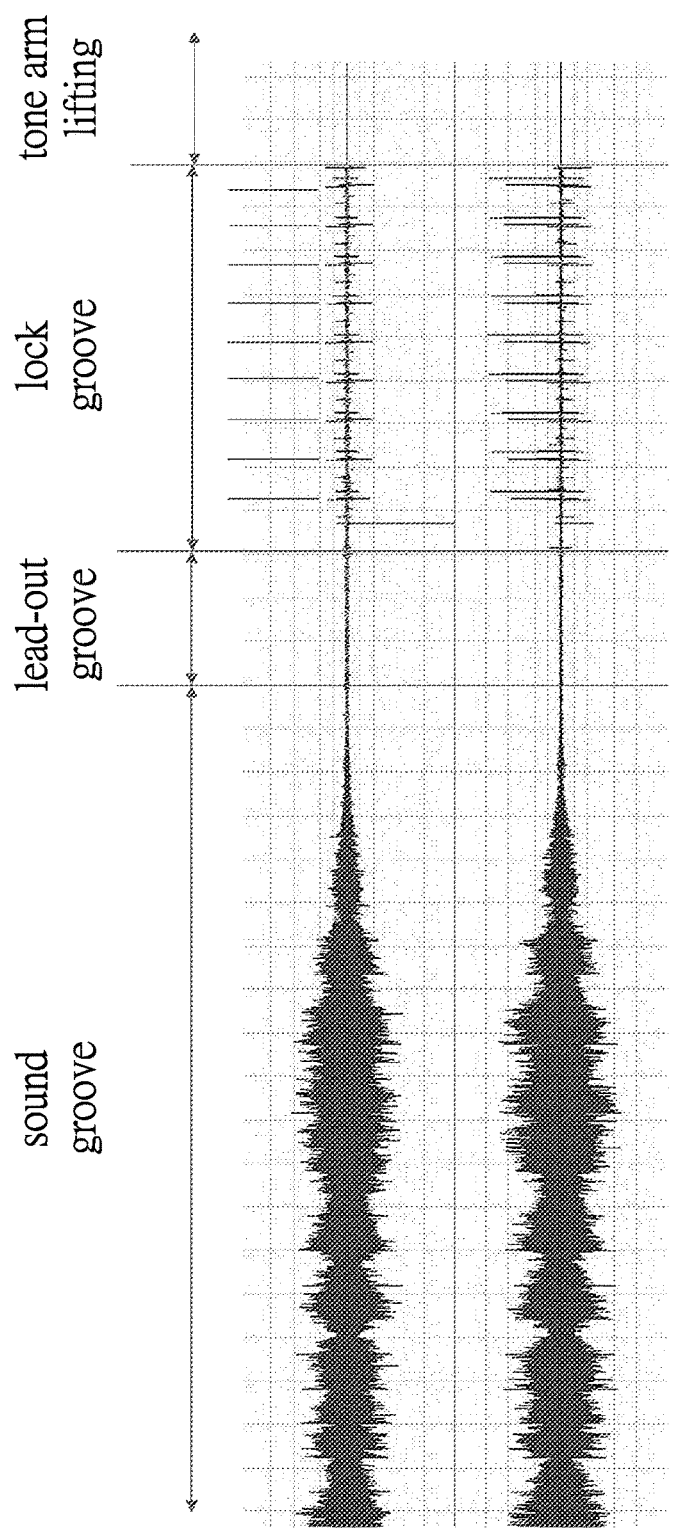
FIG. 3 is output waveforms of record signals of an embodiment according to the present invention.

As shown in FIG. 2, the record 15 includes the lead-in groove 151, the sound groove 152, the lead-out groove 153, and the lock groove 154 from outside to inside. In the beginning, the stylus 13 is in contact with the lead-in groove 151 and sliding along the outermost groove of the record 15. After reaching the end of the lead-in groove 151, the stylus 13 moves into the area of the sound groove 152 and sounds engraved in the record 15 are played. At the end of the sound groove 152, there is the lead-out groove 153 and the stylus 13 continues to move from the lead-out groove 153 to the innermost groove. Although the signal output unit 22 receives signals from the stylus 13, the signals are mute. Then the stylus 13 is moved in circles once reaching the innermost lock groove 154. Each time the stylus 13 is passed through a junction 3 between the lead-out groove 153 and the lock groove 154, a larger fluctuation (magnitude) is generated, as shown in FIG. 3. The signal output unit 22 receives feedback signals from the stylus 13 and transmits the signals to the signal reading unit 23 after gain adjustment while the signal reading unit 23 converts the signals into formats able to be used by the signal analysis unit 21 and provides the converted signals to the signal analysis unit 21. Next the signals from the signal reading unit 23 are analyzed by the signal analysis unit 21 to determine whether the stylus 13 has entered the lock groove 154 of the record 15. The signal analysis unit 21 also receives information related to on/off status and rotational speed of the turntable 14 from the vinyl record control unit 26. After analysis of all the information and signals received, the analysis result is output from the signal analysis unit 21 to the vinyl record control unit 26 for further control of the movement.

The playback of the record 15 is confirmed to be finished when the waveform obtained by analysis of the signal analysis unit 21 shows that the stylus 13 has been passed the junction 3 between the lead-out groove 153 and the lock groove 154 more than once. Then the vinyl record control unit 26 sends a command to the tone arm lifting unit 25 for lifting the tone arm 11 after receiving the analysis result from the signal analysis unit 21 and confirming the end of the playback of the record 15. Thus the tone arm 11 of the vinyl record player 1 is ascended under control of the tone arm lifting unit 25 and the stylus 13 is not in contact with the record 15. Moreover, the vinyl record control module 2 can send a stop command to the turntable control unit 24 so that the turntable 14 of the vinyl record player 1 stops rotating under control of the turntable control unit 24.

Thereby the tone arm 11 is lifted or the turntable 14 stops rotating automatically when the playback of the record 15 is finished and the state of the stylus 13 that reaches the lock groove 154 is detected by the present system.

In summary, the present invention includes the following advantages compared with the techniques available now.

1. The present system includes the vinyl record player and the vinyl record control module mounted to the vinyl record player. The signal output unit of the vinyl record control module is electrically connected to the stylus of the vinyl record player for receiving feedback signals from the stylus and transmitting the signals to the signal reading unit and the signal analysis unit. Thereby the location of the stylus now on which area of the record is analyzed and learned. Once the system detects that the stylus is passed through the junction between the lead-out groove and the lock groove continuously, this represents the playing of the record is finished and the next movement is going to the executed.

2. The vinyl record control module of the present system can include the turntable control unit, or the tone arm lifting unit, or both. The vinyl record control unit sends a command to the tone arm lifting unit for ascending the tone arm when the signal analysis unit sends the analysis result related to the end of the playback to the vinyl record control unit so that the stylus is not in contact with the record. Or the turntable stops rotating. Thereby the present system can stop movement of the vinyl record player even the user doesn't notice that the record is complete. Thus the wear of the stylus is minimized and the service life of the stylus is prolonged.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A detection system of vinyl record players for detecting end of playback comprising:
   a vinyl record player having a tone arm, a cartridge connected to one end of the tone arm, a stylus connected to the cartridge and a turntable; and
   a vinyl record control module that is mounted to the vinyl record player and including a signal analysis unit, a signal output unit, a signal reading unit, a turntable control unit, a tone arm lifting unit and a vinyl record control unit;
   wherein the vinyl record control unit is electrically connected to the signal analysis unit and the signal output unit; the signal analysis unit and the signal output unit are further electrically connected to the signal reading unit; the stylus is electrically connected to the signal output unit; the vinyl record control unit is further electrically connected to the turntable control unit and the tone arm lifting unit.

2. The system as claimed in claim 1, wherein a record is placed on the turntable.

3. The system as claimed in claim 2, wherein the record includes a lead-in groove, a sound groove connected to the lead-in groove, a lead-out groove connected to the sound groove, and a lock groove connected to the lead-out groove.

4. The system as claimed in claim 1, wherein the signal output unit receives signals from the stylus.

5. The system as claimed in claim 1, wherein the turntable control unit is electrically connected to the turntable.

6. The system as claimed in claim 5, wherein the turntable control unit drives the turntable directly by a drive motor; or the turntable control unit drives the turntable through a belt connected to the drive motor.

7. The system as claimed in claim 1, wherein the tone arm lifting unit is electrically connected to the tone arm.

8. A detection system of vinyl record players for detecting end of playback comprising:
   a vinyl record player having a tone arm, a cartridge connected to one end of the tone arm, a stylus connected to the cartridge and a turntable; and
   a vinyl record control module that is mounted to the vinyl record player and including a signal analysis unit, a signal output unit, a signal reading unit, a turntable control unit, and a vinyl record control unit;
   wherein the vinyl record control unit is electrically connected to the signal analysis unit and the signal output unit; the signal analysis unit and the signal output unit are further electrically connected to the signal reading unit; the stylus is electrically connected to the signal output unit; the vinyl record control unit is further electrically connected to the turntable control unit.

9. The system as claimed in claim 8, wherein a record is placed on the turntable.

10. The system as claimed in claim 9, wherein the record includes a lead-in groove, a sound groove connected to the lead-in groove, a lead-out groove connected to the sound groove, and a lock groove connected to the lead-out groove.

11. The system as claimed in claim 8, wherein the signal output unit receives signals from the stylus.

12. The system as claimed in claim 8, wherein the turntable control unit is electrically connected to the turntable.

13. The system as claimed in claim 12, wherein the turntable control unit drives the turntable directly by a drive motor; or the turntable control unit drives the turntable through a belt connected to the drive motor.

14. A detection system of vinyl record players for detecting end of playback comprising:
   a vinyl record player having a tone arm, a cartridge connected to one end of the tone arm, a stylus connected to the cartridge and a turntable; and
   a vinyl record control module that is mounted to the vinyl record player and including a signal analysis unit, a signal output unit, a signal reading unit, a tone arm lifting unit, and a vinyl record control unit;
   wherein the vinyl record control unit is electrically connected to the signal analysis unit and the signal output unit; the signal analysis unit and the signal output unit are further electrically connected to the signal reading unit; the stylus is electrically connected to the signal output unit; the vinyl record control unit is further electrically connected to the tone arm lifting unit.

15. The system as claimed in claim 14, wherein a record is placed on the turntable.

16. The system as claimed in claim 15, wherein the record includes a lead-in groove, a sound groove connected to the lead-in groove, a lead-out groove connected to the sound groove, and a lock groove connected to the lead-out groove.

17. The system as claimed in claim 14, wherein the signal output unit receives signals from the stylus.

18. The system as claimed in claim 14, wherein the tone arm lifting unit is electrically connected to the tone arm.

* * * * *